United States Patent
Baumann et al.

(10) Patent No.: US 7,983,819 B2
(45) Date of Patent: Jul. 19, 2011

(54) MOTOR VEHICLE COMPRISING AN OCCUPANT RESTRAINT DEVICE

(75) Inventors: Karl-Heinz Baumann, Bondorf (DE); Michael Fehring, Neuhausen (DE); Rainer Justen, Altdorf (DE); Rodolfo Schoeneburg, Hechingen (DE)

(73) Assignee: Daimler AG, Stuttgart (DE)

( * ) Notice: Subject to any disclaimer, the term of this patent is extended or adjusted under 35 U.S.C. 154(b) by 611 days.

(21) Appl. No.: 11/667,376

(22) PCT Filed: Nov. 10, 2004

(86) PCT No.: PCT/EP2004/012684
§ 371 (c)(1), (2), (4) Date: Sep. 15, 2008

(87) PCT Pub. No.: WO2006/050740
PCT Pub. Date: May 18, 2006

(65) Prior Publication Data
US 2009/0008915 A1    Jan. 8, 2009

(51) Int. Cl.
*B60R 21/01* (2006.01)
(52) U.S. Cl. ............... 701/45; 280/735; 180/268
(58) Field of Classification Search ............ 701/45; 180/268; 280/735
See application file for complete search history.

(56) References Cited

U.S. PATENT DOCUMENTS

| | | |
|---|---|---|
| 4,985,835 A | 1/1991 | Sterler et al. |
| 5,702,124 A * | 12/1997 | Foo et al. ............ 280/735 |
| 6,036,225 A * | 3/2000 | Foo et al. ............ 280/735 |
| 6,186,539 B1 * | 2/2001 | Foo et al. ............ 280/735 |
| 6,439,007 B1 * | 8/2002 | Foo et al. ............ 70/45 |
| 6,549,836 B1 | 4/2003 | Yeh et al. |
| 6,804,595 B1 * | 10/2004 | Quail et al. ........... 701/45 |
| 7,660,655 B2 * | 2/2010 | Shen ................. 701/45 |
| 2002/0147533 A1 * | 10/2002 | Foo et al. ............ 701/45 |
| 2002/0175507 A1 * | 11/2002 | Kobayashi et al. ...... 280/735 |
| 2003/0105569 A1 | 6/2003 | Roelleke |

FOREIGN PATENT DOCUMENTS

| | | |
|---|---|---|
| DE | 38 03 426 A1 | 8/1989 |
| DE | 101 26 127 A1 | 2/2002 |
| JP | 6-56000 A | 3/1994 |

(Continued)

OTHER PUBLICATIONS

International Search Report dated Jul. 6, 2005 with English translation of relevant portion and PCT/ISA/237 with English translation of Supplementary Sheets (Fifteen (15) pages).

*Primary Examiner* — Ruth Ilan
(74) *Attorney, Agent, or Firm* — Crowell & Moring LLP

(57) ABSTRACT

A motor vehicle with an occupant restraint device, including a control device which produces a triggering signal when a predefined hazard signal is generated as a function of signals of a safety sensor system, and, accordingly, the occupant restraint vehicle acts on a vehicle occupant by at least one impact cushion. The control device generates the hazard signal at least as a function of vehicle acceleration signals and a belt state signal representing the activation or deactivation of a seat belt, deactivating the occupant restraint device at least for a certain period of time and/or activating the occupant restraint device at reduced power if the seat belt is identified as having been deactivated and vehicle acceleration signals are assigned to a critical forward displacement of the occupant if the seat belt is deactivated.

20 Claims, 1 Drawing Sheet

FOREIGN PATENT DOCUMENTS

| | | |
|---|---|---|
| JP | 8-95601 A | 4/1996 |
| JP | 11-170959 A | 6/1999 |
| JP | 11-170961 A | 6/1999 |
| JP | 2000-16230 A | 1/2000 |
| JP | 2002-225672 A | 8/2002 |
| JP | 2004-1740 A | 1/2004 |
| JP | 2004-516193 A | 6/2004 |

* cited by examiner

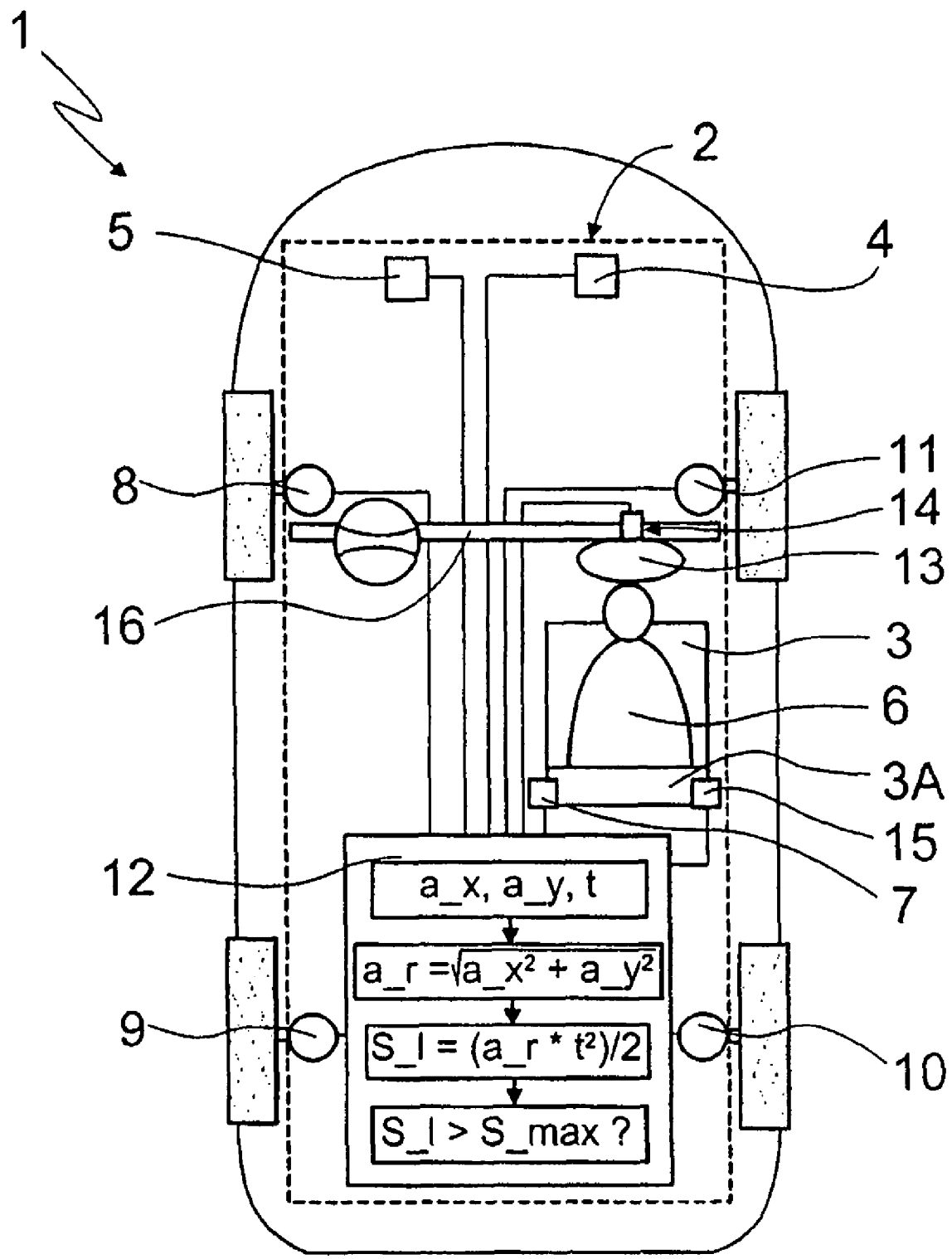

MOTOR VEHICLE COMPRISING AN OCCUPANT RESTRAINT DEVICE

CROSS REFERENCE TO RELATED APPLICATIONS

This application is a National Phase of PCT International Application No. PCT/EP2004/012684, filed Nov. 10, 2004, the entire disclosure of which is herein expressly incorporated by reference.

BACKGROUND AND SUMMARY OF THE INVENTION

The present invention relates to a motor vehicle including an occupant restraint device with a control device which produces a triggering signal when a predefined hazard signal is generated as a function of signals of a safety sensor system.

In addition to "seat belts" which hold the vehicle occupant on the vehicle seat, occupant restraint devices, which are installed as standard in motor vehicles, also include "airbag systems" with an inflatable airbag. When not in use, the inflatable airbag is arranged folded up in an accommodating space, for example, under the windshield or in the footwell in the region of a dashboard/glove compartment covering, and emerges therefrom when inflated. The airbag is inflated temporarily by a sensor-controlled gas generator such that, in order to protect the occupant, a balloon-like impact cushion is formed which then deflates.

In order to counteract the forward displacement of a vehicle occupant as early as possible, restraints for vehicle occupants are generally triggered in a "pre-crash phase" when a situation critical in terms of the dynamics of the vehicle movement is identified. Generally, the seat belt is tensioned by an electronic belt tensioner in order to avoid undesirable movements of the occupant, since crash-active restraint systems, such as airbags or other positioning devices, such as extendable cushions, can deploy an optimum protective effect only in defined positions of the occupant.

The activation of occupant restraint devices of this type takes place in practice by evaluation of sensors of a safety sensor system which detects different travel state data and the states of control systems concerned with the dynamics of the vehicle movement. If a state which is critical in terms of the dynamics of the vehicle movement is identified in this case, the restraint devices for the vehicle occupants are activated in order to prevent an undesired movement of the occupant in the vehicle interior.

An example of a method for switching on such a safety system protecting the occupants in a motor vehicle is described in German patent document DE 38 03 426 A1, in which a signal output by at least one acceleration sensor is evaluated, a hazard signal is derived from the signal of the acceleration sensor, the hazard signal describing the anticipated forward displacement of the occupant, and the safety system is activated by the hazard signal if a predeterminable threshold value is exceeded.

However, it is problematic if a vehicle occupant is not secured by a seat belt, with, in particular, unsecured passengers being moved forward in an unchecked manner if an emergency braking situation unexpectedly occurs. If, as a consequence of such an undesired forward displacement of the occupant, a vehicle impact with airbag triggering or the extension of an impact cushion in the direction of the vehicle occupant occurs, the "Out-of-Position" situation of the vehicle occupant may have a negative effect causing the vehicle occupant to be exposed to a considerable action on the part of these occupant restraint devices due to being close to the airbag outlet opening or to the inoperative position of an extendible impact cushion. In this case, it should also be taken into consideration that the vehicle occupant who is in such a forwardly displaced "Out-of-Position" situation, does not remain static in front of the outlet opening of the corresponding occupant restraint device, but rather is subject to the inertia forces prevailing during the vehicle impact.

It is therefore the object of the present invention to provide a motor vehicle with an occupant restraint device, with the situation of a forwardly displaced vehicle occupant being better taken into consideration during the triggering of the occupant restraint device.

This and other objects and advantages are achieved according to the present invention by an occupant restraint device of a motor vehicle, the control device of which produces a triggering signal when a predefined hazard signal is generated as a function of signals of a safety sensor system. Accordingly, the occupant restraint device acts on a vehicle occupant by at least one impact cushion. According to the present invention, the control device generates the hazard signal at least as a function of vehicle acceleration signals and a belt state signal representing the activation or deactivation of a seat belt. The control device deactivates the occupant restraint device at least for a certain period of time and/or activates it at reduced power in the event of the seat belt being identified as having been deactivated and there being vehicle acceleration signals to which a critical forward displacement of the occupant is assigned if the seat belt is deactivated.

If the vehicle occupant is not secured and there is a braking action with a defined deceleration which may lead to an undesired forward displacement of the occupant, the occupant restraint device, which acts with an impact cushion on the vehicle occupant, is therefore deactivated temporarily or activated at reduced power in order to avoid too severe an action on the vehicle occupant. It is also possible to provide delayed activation at reduced force or in accordance with a predetermined, situation-adapted force profile. The triggering of the occupant restraint device is therefore adapted to the position of a vehicle occupant whose is not secured such that the latter is not unnecessarily severely and adversely affected by the occupant restraint device.

In order to take into consideration as precisely as possible the risk to which the vehicle occupant who is not secured is exposed when the occupant restraint device is triggered, it is advantageous if in order to generate the hazard signal, the control device evaluates the vehicle acceleration signals in terms of magnitude and their temporal profile, in particular in a pre-crash phase preceding a vehicle impact.

The evaluation of the vehicle deceleration profile in the period of time preceding the impact is a central element in deciding the temporal deactivation of the occupant restraint device or the activation thereof at reduced power with a reduced number of elements acting on the vehicle occupant.

Therefore, in a configuration of the occupant restraint device as an airbag module with a deployable airbag as impact cushion, the airbag can be deployed in at least two stages, if appropriate at differing power or dynamics, with the control device outputting a signal in order to trigger just one stage at a reduced power or with weaker triggering dynamics in the event of the seat belt being identified as having been deactivated and there being vehicle acceleration signals assigned to a critical forward displacement of the occupant. In the case of a known, two-stage airbag gas generator, this can mean that, in the event of the seat belt being identified as having been deactivated and there being vehicle acceleration signals assigned to a critical forward displacement of the occupant, the control device outputs a signal in order to trigger just the first stage, and the second stage or, if appropriate, even a further stage of the airbag is deactivated.

In an advantageous embodiment of the invention, it can be provided that the control device evaluates a deceleration magnitude, which is determined via a longitudinal acceleration sensor, and/or a deceleration magnitude, which is determined via a transverse acceleration sensor as a vehicle acceleration signal. In this case, a deceleration magnitude resulting from these deceleration magnitudes can also be determined and can be evaluated as vehicle acceleration sensor.

In addition or as an alternative thereto, the control device may evaluate a deceleration magnitude, which is determined via the vehicle speed, in the longitudinal direction of the vehicle as vehicle acceleration signal, with it being possible here to use the output signals of wheel rotational speed sensors as signals representing the vehicle speed.

The use of the signals of a longitudinal acceleration sensor and, if appropriate, of a transverse acceleration sensor and/or of wheel rotational speed sensors makes it possible to take the actual deceleration of the vehicle into consideration, and therefore, for example in the event of emergency braking with a low carriage way coefficient of friction and consequently only a small deceleration of the vehicle, no deactivation or a reduced triggering of the occupant restraint device takes place.

As a further input variable, the effective duration of the vehicle deceleration or of the particular deceleration magnitude may be measured, and the effective duration may be established via the longitudinal acceleration sensors, transverse acceleration sensors and wheel rotational speed sensors.

In addition to the configuration of the occupant restraint devices in an airbag system, it is furthermore possible to provide, as an occupant restraint device with an impact cushion, any desired movable impact bodies, the size, hardness, shape and position of which can be changed by an activation.

The definition of a critical forward displacement of the occupant is of great significance, and a forward displacement of the occupant may be considered critical when a forward displacement travel, which is calculated from the vehicle acceleration signals and its effective duration, is greater than a threshold of a forward displacement travel.

In this case, the threshold of the forward displacement travel can be defined in a simple manner as a function of the distance between a dashboard/glove compartment covering and a maximum rearward position of a vehicle seat or of the backrest thereof. The maximum forward displacement travel arises from the dimensional concept of the vehicle when the vehicle seat position is at the rearmost point, measured by way of the occupant upper body on the backrest until the first contact with the dashboard/glove compartment covering. This value can be determined from the constructional data of the vehicle and can be stored in the triggering algorithm of the occupant restraint device.

Since the maximum forward displacement travel is reduced depending on the longitudinal adjustment of the vehicle seat and inclination of the backrest, use can also be made, for example, of a signal from an electronic device for detecting the position of the vehicle seat, as is generally present in the case of a motorized seat adjustment device.

Whereas, in the case of a simple embodiment of the invention, the occupant can be depicted as a mass which is freely moveable in relation to the vehicle, it can furthermore also be provided to take a possible supporting of the occupant into consideration via a corresponding correction value or for morphological data of the vehicle occupant, which can be determined, for example, via a seat occupation device or via passenger compartment monitoring devices, and for further information about the occupant position, which information is available via devices of this type, to be output to the control device for activating the occupant restraint device.

Other objects, advantages and novel features of the present invention will become apparent from the following detailed description of the invention when considered in conjunction with the accompanying drawing.

BRIEF DESCRIPTION OF THE DRAWING

The drawing is a schematic illustration of an exemplary embodiment of a motor vehicle configured according to the invention, which is explained in more detail in the description below.

DETAILED DESCRIPTION OF THE DRAWING

The drawing shows a highly schematized plan view of a motor vehicle 1 which can be embodied as a passenger vehicle or else as a commercial vehicle and which is equipped with a protection system acting in a preventive manner.

The protection system acting in a preventive manner has a safety sensor system 2 which has, inter alia, a driving state sensor system with a longitudinal acceleration sensor 4 determining a vehicle longitudinal acceleration $a\_x$, and a transverse acceleration sensor 5 determining a vehicle transverse acceleration $a\_y$. Furthermore, the driving state sensor system includes wheel rotation speed sensors 8, 9, 10 and 11, via the signals of which a vehicle speed $v\_x$ can be determined.

The driving state sensor system is therefore configured in order to detect dynamic longitudinal and dynamic transverse driving state information, inter alia in order to identify emergency and panic braking, or oversteering and/or understeering of the motor vehicle 1. Of course, the driving state sensor system can communicate in a manner known per se with further functionalities concerned with the dynamics of the vehicle movement, such as an antilock braking system and/or an electronic stability program, and can detect further information for important variables concerned with the dynamics of the vehicle movement, such as yaw acceleration, compression and rebound travel, the level of the vehicle, a gas pedal movement, a gas pedal position, a brake pedal position, a brake pedal movement, a steering angle and a steering angle speed, etc.

The safety sensor system 2 may also include a belt buckle 7 of a seat belt 15, which belt buckle is shown in the drawing in respect of a passenger seat 3 with an occupant 6 on it and detects an open or closed state of the belt.

In the same manner as the longitudinal acceleration sensor 4, the transverse acceleration sensor 5 and the wheel rotational speed sensors 8, 9, 10 and 11, the belt buckle 7 passes signals to a control device 12 which activates an occupant restraint device 14 which is designed here as an airbag module with an inflatable airbag 13 as the impact cushion.

As a function of the signals of the safety sensor system 2, the control device 12 generates a hazard signal, compares the latter with a predefined threshold value and, if the threshold value is exceeded, produces a triggering signal for the airbag module 14 with corresponding deployment of the airbag 13. The airbag module 14 is deactivated at least for a certain period of time or activated at reduced power, i.e., activates only a first of two stages, if appropriate with a delay, in the event of the seat belt 15 being identified as having been deactivated and there being vehicle acceleration signals to which a critical forward displacement of the occupant is assigned when the seat belt 15 is deactivated.

Specifically, the control device 12 calculated from the deceleration magnitude a_x, which is determined via the longitudinal acceleration sensor 4, and the deceleration magnitude a_y, which is determined via the transverse acceleration sensor 5, a resulting deceleration magnitude a_r in accordance with the formula $$a\_r = \sqrt{(a\_x^2 + a\_y^2)}$$

and evaluates the resulting deceleration magnitude a_r as a vehicle acceleration signal.

In addition, in order to check plausibility, the longitudinal deceleration of the vehicle is calculated from the vehicle speed v_x, which is determined with reference to the wheel rotational speed sensors 8, 9, 10, 11.

A further input variable of the control device 12 is the particular effective duration t of the deceleration magnitudes, with the effective duration t being detected by the sensors which detect the deceleration values.

In the present exemplary embodiment, the triggering algorithm stored in the control device 12 for the airbag module 14 provides that a forward displacement of the occupant is defined as critical if a forward displacement travel S_1, which is calculated from the vehicle acceleration signals a_x, a_y, a_r and their effective duration t, is greater than a threshold of a forward displacement travel S_max.

The forward displacement travel S_1 can be calculated in accordance with the function $$S\_1 = (a\_r * t^2)/2.$$

The maximum forward displacement travel S_max serving here as the threshold value arises from the geometrical conditions in the interior of the motor vehicle 1, with the distance between a backrest 3A of the passenger's seat 3 and a dashboard/glove compartment covering 16, as contact surfaces for the upper body of the occupant 6, serving in a simple manner to define the maximum forward displacement travel S_max.

If the calculated forward displacement travel S_1 is greater than the predetermined maximum forward displacement travel S_max, a hazard signal is generated which has the consequence that the control device 12 temporarily prevents a triggering signal for the airbag module 14 or outputs a triggering signal for an appropriately moderated triggering of the airbag.

It goes without saying that, in the calculation of the individual signals, this can be made of suitable filters, plausibility checks and correction factors which are adequately known per se and therefore are not described in more detail in the present case.

Although the activation, configured in accordance with the invention, of an occupant restraint device with an impact cushion is particularly suitable for passengers who are not secured and are at high risk, an appropriately equipped occupant restraint device can also be used on other seats with the geometrical conditions being appropriately taken into consideration.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A motor vehicle comprising:
an occupant restraint device, including a control device that produces a triggering signal when a predefined hazard signal is generated as a function of signals from a safety sensor system, the occupant restraint device configured to act on a vehicle occupant by at least one impact cushion; wherein,
the control device is configured to generate the hazard signal at least as a function of vehicle acceleration signals and a belt state signal representing activation or deactivation of a seat belt;
the control device deactivates the occupant restraint device for a predetermined period of time or activates the occupant restraint device at reduced power if the seat belt is identified as having been deactivated;
first vehicle acceleration signals are assigned to a critical forward displacement of the occupant if the seat belt is deactivated; and
a forward displacement of the occupant is defined as critical when a forward displacement travel, which is calculated from the vehicle acceleration signals and an effective duration of the forward displacement travel, is greater than a threshold of the forward displacement travel.

2. The motor vehicle as claimed in claim 1, wherein the control device evaluates a deceleration magnitude, which is determined via a longitudinal acceleration sensor, as a first vehicle acceleration signal.

3. The motor vehicle as claimed in claim 2, wherein the control device determines a resulting deceleration magnitude from the deceleration magnitude determined via the longitudinal acceleration sensor and a deceleration magnitude determined via a transverse acceleration sensor, and evaluates the resulting deceleration magnitude as a second vehicle acceleration signal.

4. The motor vehicle as claimed in claim 1, wherein the control device evaluates a deceleration magnitude, which is determined via a transverse acceleration sensor, as a first vehicle acceleration signal.

5. The motor vehicle as claimed in claim 4, wherein the control device determines a resulting deceleration magnitude from the deceleration magnitude determined via the longitudinal acceleration sensor and a deceleration magnitude determined via a transverse acceleration sensor, and evaluates the resulting deceleration magnitude as a second vehicle acceleration signal.

6. The motor vehicle as claimed in claim 1, wherein the control device evaluates a deceleration magnitude, which is determined via the vehicle speed in the longitudinal direction of the vehicle, as a first vehicle acceleration signal.

7. The motor vehicle as claimed in claim 6, wherein signals from wheel rotational speed sensors that represent the vehicle speed are output to the control device.

8. The motor vehicle as claimed in claim 1, wherein the control device evaluates an effective duration of the vehicle acceleration signals.

9. The motor vehicle as claimed in claim 1, wherein the threshold of the forward displacement travel is defined as a function of the distance between a maximum rearward position of a vehicle seat and one of a dashboard compartment covering and a glove compartment covering.

10. The motor vehicle as claimed in claim 1, wherein the impact cushion is a deployable airbag.

11. The motor vehicle as claimed in claim 10, wherein the airbag is deployable in at least two stages, with the control device outputting a signal to trigger a first stage if the seat belt is identified as having been deactivated and if the vehicle acceleration signals are assigned to a critical forward displacement of the occupant.

12. The motor vehicle as claimed in claim 1, wherein the impact cushion is formed by an extendable cushion element arranged in the region of one of a dashboard compartment covering and a glove compartment covering.

13. The motor vehicle as claimed in claim 1, wherein the occupant restraint device is assigned to a passenger seat.

14. The motor vehicle as claimed in claim 1, wherein, in order to generate the hazard signal, the control device evaluates the vehicle acceleration signals in terms of magnitude and temporal profile in a pre-crash phase preceding a vehicle impact.

15. The motor vehicle as claimed in claim 14, wherein the control device evaluates a deceleration magnitude, which is determined via a longitudinal acceleration sensor, as a first vehicle acceleration signal.

16. The motor vehicle as claimed in claim 14, wherein the control device evaluates a deceleration magnitude, which is determined via a transverse acceleration sensor, as a first vehicle acceleration signal.

17. The motor vehicle as claimed in claim 14, wherein the control device evaluates a deceleration magnitude, which is determined via the vehicle speed in the longitudinal direction of the vehicle, as a first vehicle acceleration signal.

18. The motor vehicle as claimed in claim 14, wherein the control device evaluates an effective duration of the vehicle acceleration signals.

19. The motor vehicle as claimed in claim 14, wherein the threshold of the forward displacement travel is defined as a function of the distance between a maximum rearward position of a vehicle seat and one of a dashboard compartment covering and a glove compartment covering.

20. A method for controlling an occupant restraint device in a motor vehicle, the method comprising:
   producing a triggering signal from a control device, if a predefined hazard signal is generated as a function of signals of a safety sensor system, the hazard signal being generated at least as a function of vehicle acceleration signals and a belt state signal representing activation or deactivation of a seat belt;
   acting on a vehicle occupant by at least one impact cushion of the occupant restraint device, based on the triggering signal;
   deactivating the occupant restraint device for a predetermined period of time or activating the occupant restraint device at reduced power, if the seat belt is identified as having been deactivated; and
   assigning first vehicle acceleration signals to a critical forward displacement of the occupant, if the seat belt is deactivated,
   wherein a forward displacement of the occupant is defined as critical when a forward displacement travel, which is calculated from the vehicle acceleration signals and an effective duration of the forward displacement travel, is greater than a threshold of the forward displacement travel.

* * * * *